No. 622,162. Patented Mar. 28, 1899.
J. W. PATTISSON.
CULTIVATOR.
(Application filed Oct. 27, 1898.)
(No Model.)
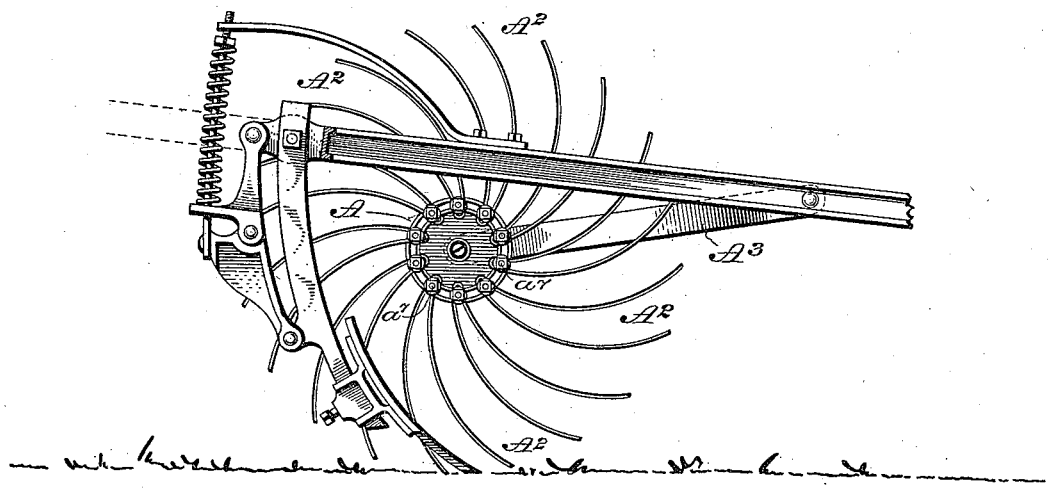
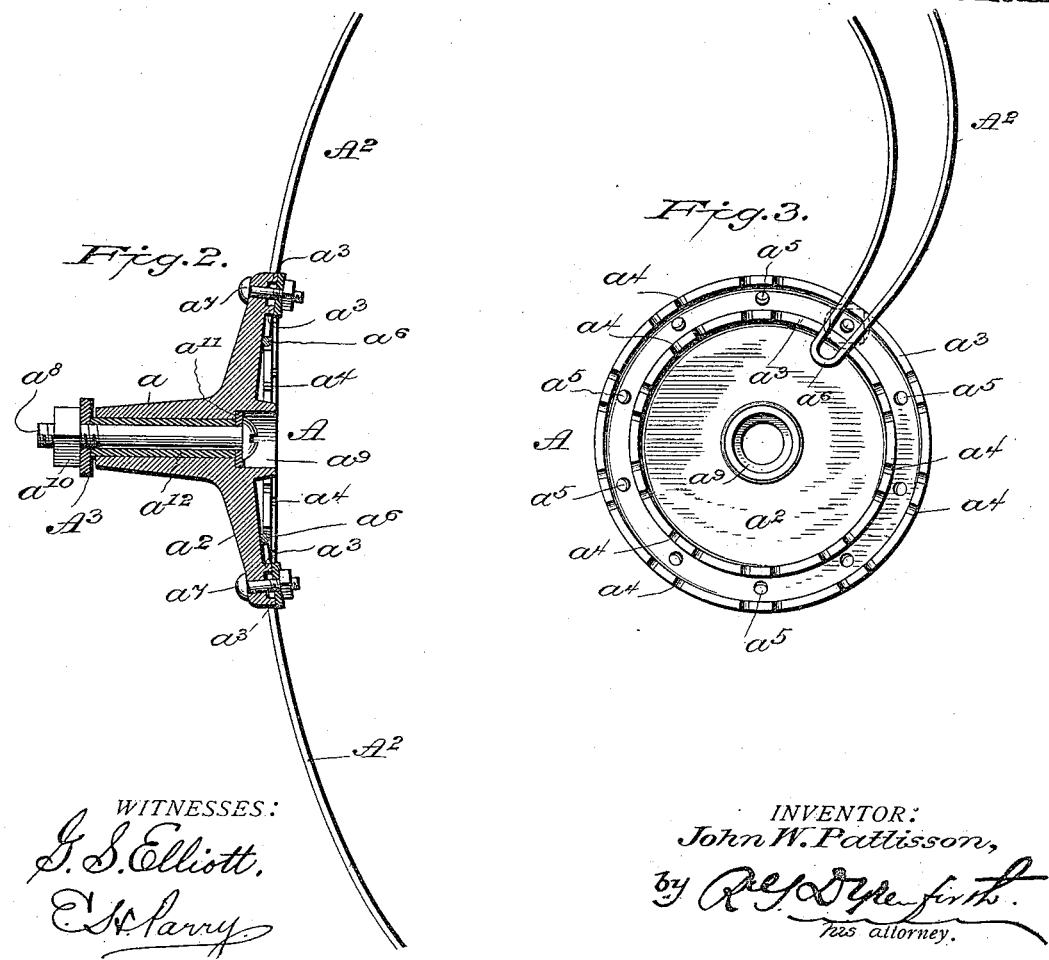
WITNESSES:
G. S. Elliott.
E. H. Parry
INVENTOR:
John W. Pattisson,
by R. S. Dye,
his attorney.

UNITED STATES PATENT OFFICE.

JOHN W. PATTISSON, OF REA, MISSOURI.

CULTIVATOR.

SPECIFICATION forming part of Letters Patent No. 622,162, dated March 28, 1899.

Application filed October 27, 1898. Serial No. 694,730. (No model.)

*To all whom it may concern:*

Be it known that I, JOHN W. PATTISSON, a citizen of the United States, residing at Rea, in the county of Andrew and State of Missouri, have invented certain new and useful Improvements in Cultivators; and I do hereby declare the following to be a full, clear, and exact description of the invention, such as will enable others skilled in the art to which it appertains to make and use the same.

The object of this invention is to provide an attachment for cultivators which in operation will allow only the finely-divided dirt to settle around the plants, all clods and trash which would be injurious to the plants being effectively fended, warded off, or thrown to the sides of the rows and into the furrows, and, furthermore, to provide a novel form of rotary cultivator-fender combining in its structural arrangement the highest durability and efficiency in use with the greatest simplicity of construction.

With these objects in view the invention consists of the novel construction and combination of parts of a cultivator-fender, as will be hereinafter fully described and claimed.

In a cultivator-fender characterized by my invention I employ a head or hub, to which the fender-arms are secured. The head comprises a hub portion and a disk portion, the two being by preference made integral and of any suitable metal, such as cast-iron. The disk is dished away from the hub and is provided on the side opposite the hub with two circumferential concentric flanges projecting at right angles to the face of the disk and provided at intervals with notches in which the fender-arms rest and are held against lateral movement. The fender-arms are by preference constructed each of a single piece of spring-steel bent upon itself to present a bend or loop to engage in the notches in the said flanges, a bolt being passed between the loop of each fender-arm and through the disk, a nut turned on the end of the bolt serving to clamp the fender-arms rigidly in place. The series of fender-arms as a whole are dished toward the plow of the cultivator and are to be of such resiliency that while sufficiently rigid for effective work they will yield to any undue strain and thus obviate the danger of breaking either the arms or the disk.

The fender as a whole is supported from the cultivator by a spring rigidly secured to the plow-beam, the spring operating to permit such lateral yield of the fender as to compensate for all strains to which the device may be subjected in use.

The fender is the same on both sides of the machine, except that the dish of the fender-arms on the right hand of the fender is the reverse of that on the left hand, as will be obvious.

The device as a whole is adapted to be easily attached to any cultivator in use without requiring any change in its construction, so that in effect the device presents an article of manufacture which may be sold by itself and be attached to a cultivator by a person of ordinary mechanical ability.

Further and more specific details of construction will be hereinafter described and claimed.

In the accompanying drawings, forming a part of this specification and in which like letters of reference indicate corresponding parts, I have illustrated a form of device embodying the essential features of my invention, it being understood that the same may be carried into effect in other ways without departing from the spirit of the same.

In the drawings, Figure 1 is a view in side elevation displaying the fender in position on a cultivator, the view showing only so much of a cultivator as is necessary to render clear an understanding of the fender with relation to the plows of a cultivator. Fig. 2 is a vertical sectional view through the center of the head or hub; and Fig. 3 is a view in elevation of the hub, showing the disk portion thereof and the notches in which the fender-arms are secured.

Referring to the drawings, A designates the head, comprising a hub portion $a$ and a disk $a^2$, the two parts being by preference cast integral. The disk $a^2$ bears on its inner face (the term "inner" being used to designate its relation to the plow) two circumferential concentric flanges $a^3$, which are provided with pairs of alined notches or recesses $a^4$, corresponding in number to the fender-arms, and between each pair of notches (the term "pair" being used to designate two alined openings in the inner and outer flanges) is an opening $a^5$ for the reception of a screw or bolt for holding the fender-arms in place. The fender-arms $A^2$ are each constructed by preference of a single piece of spring metal bent upon itself to present a bend $a^6$, which bend is designed to engage the pairs of notches $a^4$, a bolt $a^7$, passing between such bend and through the opening $a^5$, serving to hold these arms rigidly in place. As here shown, each bolt for holding the arms in place is provided with a nut and a washer; but it is to be understood that I do not limit myself to this exact construction, as the nut and washer may be dispensed with and the threaded portion of the bolt be made to engage threads provided in the openings $a^5$ for the same purpose. The fender-arm is curved in two directions—that is to say, it is tangentially curved with relation to the center of the disk and is also bellied or curved inward toward the center of the disk, so that when the arms are assembled a dish-shaped structure is presented, the function of which will appear later on.

The disk or head is supported from the cultivator by a spring $A^3$, and this spring may be appropriately shaped for the purpose, the connection between the head and the said spring being through the medium of a bolt $a^7$, the head of which is housed in a chamber $a^8$, formed on the inner side of the disk, and the outer end being engaged by a nut $a^9$ for clamping the head securely to the said spring. In this instance a washer $a^{10}$ is shown as interposed between the head of the bolt $a^7$ and the inner wall of the chamber; but it is to be understood that this washer may be omitted without affecting the efficiency of the device. By housing the head of the bolt in the chamber $a^8$ the bolt is shielded from contact with moisture and dirt to a very large degree, and the entrance of dust and dirt to the head and to the bore of the hub in which the bolt works is practically obviated, thereby adding to the life of the bolt, and thus to the efficiency of the device. In order that the head may turn easily upon the bolt and also that provision should be made whereby wear may be compensated for, I employ a sleeve $a^{10}$, which fits around the bolt $a^7$ and within the bore of the hub, and as this sleeve wears it may be removed at but a slight expense and a new one replaced therefor.

It is to be understood that all of the parts of the device are to be made of any suitable metal and may be assembled in the manner shown or in other ways without departing from the spirit of the invention.

When the fender-arms have been secured in position in the manner described, the fender presents a basin or dish shaped appearance. The fender-arms are so curved as to fend or ward off all clods and trash and allow only the fine loose dirt to pass through and rest about the roots of the growing crop. The backward curve of the fender-arms tends to allow these arms to withdraw easily from weeds and trash of all kinds, and the outward or dish-like curve of the fender-arms operates to push the clods away from the plants and allows only the loose dirt to sift through.

In operation the front shovel of each plow throws the dirt against the concave side of each fender, and the latter by rotating sifts the fine loose dirt around the roots of the plants and wards off clods and trash, and by reason of the curvature of their arms the fenders easily shed themselves without clogging.

The fender-arms being made of heavy steel wire are susceptible of standing considerable strain, and being attached to the end of a spring, which allows the fender considerable lateral motion, it is practically impossible to strain the fender.

The fender herein shown is especially designed for listed corn; but it will be found to work perfectly with any kind of planting.

Having thus fully described my invention, what I claim as new, and desire to secure by Letters Patent of the United States, is—

1. A cultivator-fender comprising a hub carrying a disk having on its inner face two circumferential, concentric flanges provided with notches, return-bend fender-arms having their bends seated in the said notches, and means for holding the arms in place, substantially as described.

2. A cultivator-fender comprising a hub carrying a disk having on its inner face two circumferential, concentric flanges provided with notches, return-bend fender-arms having their ends seated in the said notches, said arms being curved tangential to the axis of the hub and dished away from the same, and means for holding the arms in place, substantially as described.

3. The combination with a cultivator, of a fender comprising a hub carrying a disk having on its inner face two circumferential, concentric flanges provided with notches, return-bend fender-arms having their bends seated within the notches, bolts or other like fastening devices passing through openings in the disk between the bends of the fender-arms and holding the latter in place, and means for connecting the hub with the cultivator, substantially as described.

In testimony whereof I affix my signature in presence of two witnesses.

JOHN W. PATTISSON.

Witnesses:
 WILLIS G. HINE,
 A. M. LEWELLEN.